US 9,151,970 B2

(12) United States Patent
Kung et al.

(10) Patent No.: US 9,151,970 B2
(45) Date of Patent: Oct. 6, 2015

(54) PIXEL STRUCTURE

(71) Applicant: Au Optronics Corporation, Hsinchu (TW)

(72) Inventors: Yen-Ying Kung, New Taipei (TW); Wei-Cheng Cheng, New Taipei (TW); Mei-Ju Lu, Kaohsiung (TW); Sau-Wen Tsao, Taipei (TW); Cho-Yan Chen, Taichung (TW); Tien-Lun Ting, Taichung (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 14/077,172

(22) Filed: Nov. 11, 2013

(65) Prior Publication Data

US 2015/0021649 A1 Jan. 22, 2015

(30) Foreign Application Priority Data

Jul. 19, 2013 (TW) .............................. 102126004 A (51) Int. Cl.
*H01L 33/00* (2010.01)
*B82Y 20/00* (2011.01)
*G02F 1/13* (2006.01)
*G02F 1/1343* (2006.01)

(52) U.S. Cl.
CPC ............ *G02F 1/13* (2013.01); *G02F 1/134363* (2013.01); *G02F 2001/134345* (2013.01)

(58) Field of Classification Search
CPC ................. H01L 33/62; H01L 33/486; H01L 2224/48091; H01L 33/32; H01L 33/38; H01L 33/0079; H01L 33/007; H01L 21/0254; H01L 51/0545; H01L 51/0036; H01L 51/0541; H01L 51/5012; H01L 27/1214; H01L 51/56; B82Y 20/00; B82Y 10/00; Y02E 10/50
USPC .......... 257/57, 59, 66, 72, 390, 443, E21.411, 257/E21.412, E51.005, E29.151, E27.1, 257/E29.117; 438/30, 149, 158–159
See application file for complete search history.

(56) References Cited

U.S. PATENT DOCUMENTS 7,760,282 B2    7/2010  Lee et al.
2010/0020283 A1*  1/2010  Suzuki ......................... 349/141

FOREIGN PATENT DOCUMENTS

KR    20080025776    3/2008

* cited by examiner

*Primary Examiner* — Steven Loke
*Assistant Examiner* — Didarul Mazumder
(74) *Attorney, Agent, or Firm* — Jianq Chyun IP Office (57) ABSTRACT

A pixel structure having a first region and a second region adjacent to each other is provided. The pixel structure includes a first pixel electrode and a second pixel electrode. The first pixel electrode forms a plurality of first V-shaped electrode patterns. A tip of the first V-shaped electrode patterns is located at a boundary of the first region and the second region. The second pixel electrode includes a plurality of second V-shaped electrode patterns and a first protrusion electrode pattern. The first protrusion electrode pattern is connected to one of the second V-shaped electrode patterns and protrudes towards an adjacent first V-shaped electrode pattern from the tip of the second V-shaped electrode pattern.

13 Claims, 5 Drawing Sheets

PIXEL STRUCTURE

CROSS-REFERENCE TO RELATED APPLICATION

This application claims the priority benefit of Taiwan application serial no. 102126004, filed on Jul. 19, 2013. The entirety of the above-mentioned patent application is hereby incorporated by reference herein and made a part of this specification.

BACKGROUND OF THE INVENTION

1. Field of the Invention

The invention relates to a pixel structure, and more particularly to a pixel structure having two pixel electrodes.

2. Description of Related Art

Nowadays, multimedia technology has been well developed, which mostly benefits from the development of semiconductor devices and display apparatuses. As for the display, the liquid crystal display having superior features such as high picture quality, good space utilization efficiency, low power consumption and no radiation becomes the mainstream in the market. To have a better display quality, various types of liquid crystal display with wide viewing angle are developed, and the common ones are, for example, in-plane switching (IPS) liquid crystal displays, multi-domain vertically alignment (MVA) liquid crystal displays, fringe field switching (FFS) liquid crystal displays, and so on.

As for the IPS LCD and the FFS LCD, a driving electric field is substantially paralleled with a substrate, and liquid crystal molecules are rotated in a direction parallel with the substrate to achieve the light valve function for displaying a gray level. The pixel structures of the two types of LCD adopt two pixel electrodes configured with an interval, and the two pixel electrodes form an electric field passing through the interval therebetween by being applied with different voltages.

However, if a plurality of alignment domains are to be defined in the IPS and the FFS LCDs, two pixel electrodes are required to have a plurality of strip-shaped electrode patterns, respectively. In that meantime, it is likely to require an additional connecting electrode to be configured so that the stripe-shaped electrode patterns of the same pixel electrode can be connected to the same potential, such connecting electrode staggering another pixel electrode will cause poor distribution of the electric field.

SUMMARY OF THE INVENTION

The invention provides a pixel structure which may provide a desired distribution of a driving electric field, allowing the liquid crystals to have a desired arranging direction when driving the liquid crystals.

In the invention, a pixel structure having a first region and a second region adjacent to each other is provided. The pixel structure includes a first pixel electrode and a second pixel electrode. The first pixel electrode is connected to a first potential and includes a plurality of first oblique electrode patterns located in a first region and a plurality of second oblique electrode patterns located in a second region. At least a portion of the first oblique electrode patterns is connected to at least a portion of the second oblique electrode patterns so as to form a plurality of first V-shaped electrode patterns. A tip of the first V-shaped electrode patterns is located at a boundary of the first region and the second region. The second pixel electrode is connected to a second potential and includes a plurality of third oblique electrode patterns, a plurality of fourth oblique electrode patterns and a plurality of first protrusion electrode patterns. The third oblique electrode patterns and the first oblique electrode patterns are alternately arranged in the first region. The fourth oblique electrode patterns and the second oblique electrode patterns are alternately arranged in the second region. At least a portion of the third oblique electrode patterns is connected to at least a portion of the fourth electrode patterns so as to form a plurality of second V-shaped electrode patterns, and each of the first protrusion electrode patterns is connected to one of the second V-shaped electrode patterns and protrudes towards an adjacent first V-shaped electrode pattern from a tip of the corresponding second V-shaped electrode pattern.

In an embodiment of the invention, the first oblique electrode patterns and the third oblique electrode patterns are respectively parallel with a first direction; the second oblique electrode patterns and the fourth oblique electrode patterns are respectively parallel with a second direction.

In an embodiment of the invention, a distance d is kept between each of the second V-shaped electrode patterns and the adjacent first V-shaped electrode pattern; a protruding length of each of the first protrusion electrode patterns towards the adjacent first V-shaped electrode pattern is substantially no less than 2.5% of the distance d.

In an embodiment of the invention, each of the first protrusion electrode patterns and the adjacent first V-shaped electrode pattern are separated from each other.

In an embodiment of the invention, the first pixel electrode further includes a first connecting portion located in the first region and a second connecting portion located in the second region. The first connecting portion is connected to a portion of the first oblique electrode patterns; the second connecting portion is connected to a portion of the second oblique electrode patterns. The second pixel electrode further includes a third connecting portion located in the first region and a fourth connecting portion located in the second region. The third connecting portion is connected to a portion of the third oblique electrode patterns; the fourth connecting portion is connected to a portion of the fourth oblique electrode patterns.

In an embodiment of the invention, the pixel structure further includes a connecting electrode, wherein the connecting electrode is electrically connected to the first pixel electrode and has the first potential. The connecting electrode is located at the boundary of the first region and the second region, and the first protrusion electrode patterns are overlapped with the connecting electrode. The first pixel electrode further includes a first connecting portion located in the first region and a second connecting portion located in the second region. The first connecting portion is connected to a portion of the first oblique electrode patterns, and the second connecting portion is connected to a portion of the second oblique electrode patterns. The second pixel electrode further includes a third connecting portion located in the first region and a fourth connecting portion located in the second region. The third connecting portion is connected to a portion of the third oblique electrode patterns, and the fourth connecting portion is connected to a portion of the fourth oblique electrode patterns. The first connecting portion, the second connecting portion, the third connecting portion, the fourth connecting portion, and the connecting electrode extend in the same extending direction. The first connecting portion and the third connecting portion are located at a first side of the connecting electrode; the second connecting portion and the fourth connecting portion are located at a second side of the connecting electrode. In addition, the portion of the first oblique electrode patterns connected to the first connecting portion and the rest of the third oblique electrode patterns not connected to the third connecting portion are configured between the first connecting portion and the connecting electrode. The portion of the third oblique electrode patterns connected to the third connecting portion are configured between the third connecting portion and the connecting electrode and the rest of the first oblique electrode patterns not connected to the first connecting portion. The portion of the second oblique electrode patterns connected to the second connecting portion and the rest of the fourth oblique electrode patterns not connected to the fourth connecting portion are configured between the second connecting portion and the connecting electrode. The portion of the fourth oblique electrode patterns connected to the fourth connecting portion are configured between the fourth connecting portion and the connecting electrode and the rest of the second oblique electrode patterns not connected to the second connecting portion.

In an embodiment of the invention, an extending direction of the connecting electrode intersects with an extending direction of the first connecting portion, the second connecting portion, the third connecting portion, and the fourth connecting portion. Moreover, the first connecting portion and the fourth connecting portion are located at a first end of the connecting electrode; the second connecting portion and the third connecting portion are located at a second end of the connecting electrode. Meanwhile, all the first oblique electrode patterns and all the third oblique electrode patterns are configured between the first connecting portion and the third connecting portion; all the second oblique electrode patterns and all the fourth oblique electrode patterns are configured between the second connecting portion and the fourth connecting portion.

In an embodiment of the invention, the pixel structure further includes a first active device. One of the first pixel electrode and the second pixel electrode is connected to the first active device; the other one of the first pixel electrode and the second pixel electrode is connected to a common electrode.

In an embodiment of the invention, the pixel structure further includes a first active device and a second active device connecting to the first pixel electrode and the second pixel electrode, respectively.

In an embodiment of the invention, the first active device and the second active device of the pixel structure are driven by the same scan line.

In an embodiment of the invention, the first active device and the second active device of the pixel structure are connected to different data lines.

In an embodiment of the invention, the first pixel electrode further includes a plurality of second protrusion electrode patterns, and each of the second protrusion electrode patterns is connected to one of the first V-shaped electrode patterns and protrudes towards an adjacent second V-shaped electrode pattern from the corresponding first V-shaped electrode pattern.

Based on the above, in the pixel structure in the embodiments of the invention, two pixel electrodes that are predetermined to be applied with different voltages have a strip-shaped oblique electrode pattern, respectively, thereby defining different alignment domains. Meanwhile, the connecting electrode is configured in the pixel structures to connect a plurality of oblique electrode patterns in one of the pixel electrodes to the same potential. In the pixel structure in the embodiments of the invention, the other pixel electrode having a potential different from the connecting electrode has a protrusion electrode pattern overlapped with the connecting electrode, thereby allowing the electric field between the two pixel electrodes to drive the liquid crystal arranged in the required direction.

In order to make the aforementioned features and advantages of the invention more comprehensible, embodiments accompanying figures are described in detail below.

DESCRIPTION OF EMBODIMENTS

Figure 1:
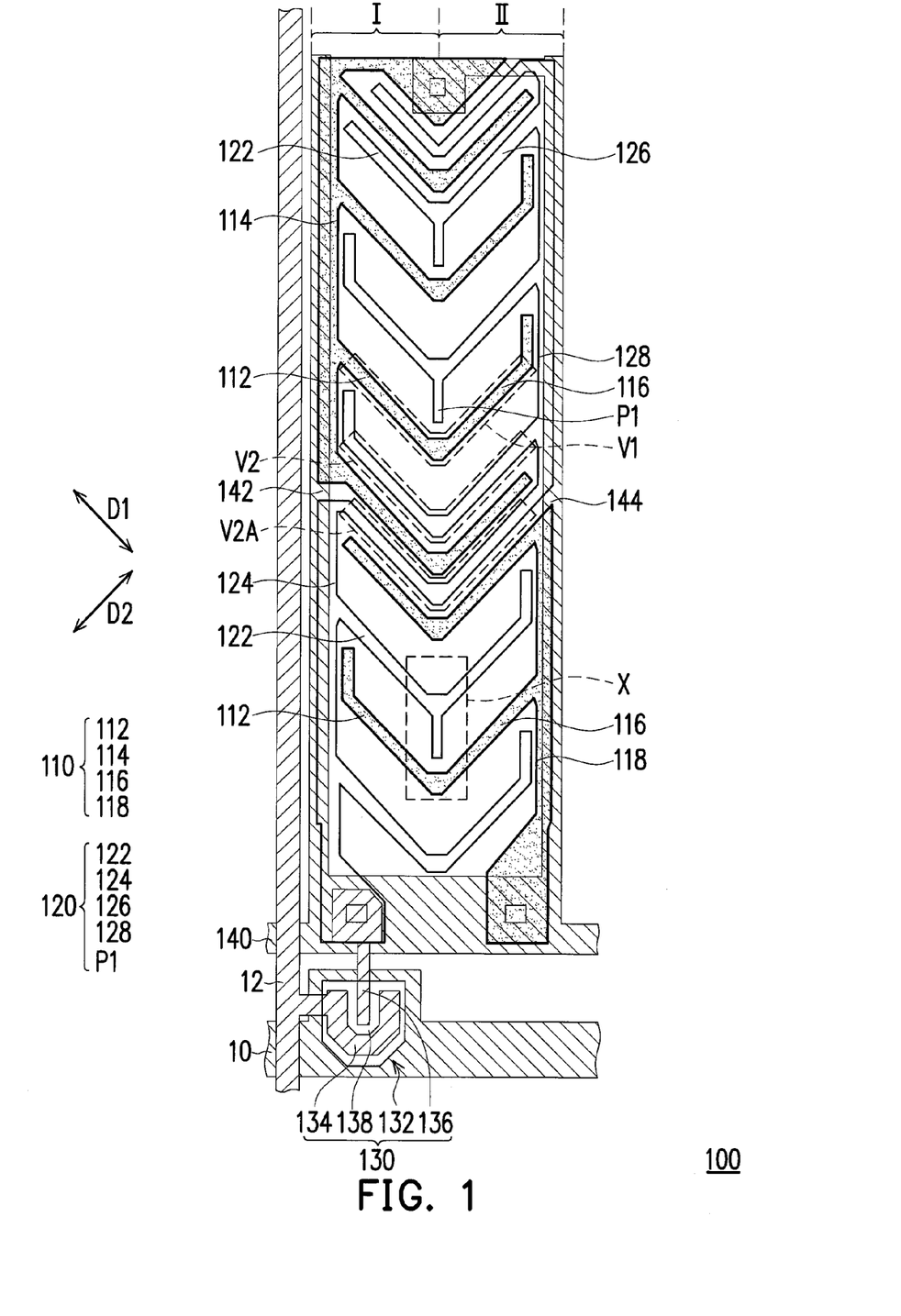
FIG. 1 is a top view illustrating a pixel structure in a first embodiment of the invention.

FIG. 1 is a top view illustrating a pixel structure in a first embodiment of the invention. Please refer to FIG. 1. A pixel structure 100 includes a first pixel electrode 110, a second pixel electrode 120, an active device 130, and a common electrode 140. The active device 130 includes, for example, a gate 132 connected to a scan line 10, a source 134 connected to a data line 12, a drain 136, and a channel 138 at least located between the source 134 and the drain 136. In the embodiment, the first pixel electrode 110 is electrically connected to the common electrode 140, and the second pixel electrode 120 is, for example, connected to the drain 136. Therefore, when the pixel structure 100 is driven, the first pixel electrode 110 and the second pixel electrode 120 may be applied with different first potential and second potential, respectively. Specifically, a first region I and a second region II may be defined in the pixel structure 100, wherein the first region I and the second region II are adjacent to each other. Moreover, the patterns of the first pixel electrode 110 and the second pixel electrode 120 in the first region I are different from the patterns in the second region II.

The first pixel electrode 110 includes a plurality of first oblique electrode patterns 112 located in the first region I, a first connecting portion 114 located in the first region I, a plurality of second oblique electrode patterns 116 located in the second region II, and a second connecting portion 118 located in the second region II. The first oblique electrode patterns 112 are respectively parallel with a first direction D1, and the second oblique electrode patterns 116 are respectively parallel with a second direction D2, wherein the first direction D1 is different from the second direction D2. Therefore, an extending direction of the first oblique electrode patterns 112 located in the first region I is different from an extending direction of the second oblique electrode patterns 116 located in the second region II.

In addition, in the embodiment, each of the first oblique electrode patterns 112 is connected to one of the second oblique electrode patterns 116 to constitute a first V-shaped electrode pattern V1. The first V-shaped electrode patterns V1 are located between an extending trace of the first connecting portion 114 and an extending trace of the second connecting portion 118; a tip of the first V-shaped electrode patterns V1 is located at the boundary of the first region I and the second region II.

The second pixel electrode 120 includes a plurality of third oblique electrode patterns 122 located in the first region I, a third connecting portion 124 located in the first region I, a plurality of fourth oblique electrode patterns 126 located in the second region II, a second connecting portion 128 located in the second region II, and a plurality of protrusion electrode patterns P1 located at the boundary of the first region I and the second region II. The third oblique electrode patterns 122 located in the first region I are respectively parallel with the first direction D1, and the fourth oblique electrode patterns 126 located in the second region II are respectively parallel with the second direction D2. Therefore, an extending direction of the third oblique electrode patterns 122 located in the first region I is different from an extending direction of the fourth oblique electrode patterns 126 located in the second region II.

In addition, in the embodiment, each of the third oblique electrode patterns 122 is connected to one of the fourth oblique electrode patterns 126 to constitute a second V-shaped electrode patterns V2. A tip of the second V-shaped electrode patterns V2 is located at the boundary of the first region I and the second region II. Specifically, the first V-shaped electrode patterns V1 and the second V-shaped electrode patterns V2 are alternately arranged. In addition, the first protrusion electrode pattern P1 is connected to one of the second V-shaped electrode patterns V2 and protrudes towards an adjacent first V-shaped electrode pattern V1 from the tip of the second V-shaped electrode pattern V2.

In the embodiment, one of the second V-shaped electrode patterns V2 is labeled as V2A, wherein the second V-shaped electrode pattern V2A is connected to the third connecting portion 124 and the fourth connecting portion 128 at the same time. In addition, the third oblique electrode patterns 122 located between the second V-shaped electrode pattern V2A and the scan line 10 are connected to the third connecting portion 124; the fourth oblique electrode patterns 126 at a side distant from the scan line 10 of the second V-shaped electrode pattern V2A are connected to the fourth connecting portion 128.

FIG. 1 shows that the first V-shaped electrode patterns V1 may be divided into two groups by the second V-shaped electrode patterns V2A, wherein the first group is located between the second V-shaped electrode patterns V2A and the scan line 10; the second group is located a side distant from the scan line 10 of the second V-shaped electrode patterns V2A. In the embodiment, all the second oblique electrode patterns 116 in the first V-shaped electrode patterns V1 of the first group are connected to the second connecting portion 118. In the meantime, all the first oblique electrode patterns 112 in the first V-shaped electrode patterns V1 of the second group are connected to the first connecting portion 114. Therefore, the first V-shaped electrode patterns V1 of the first group and the second group are not directly connected in structure. Nevertheless, the first V-shaped electrode patterns V1 of the first group and the second group are connected to the common electrode 140.

The common electrode 140 may substantially include a first branch 142 and a second branch 144. The first branch 142 is, for example, overlapped with the first connecting portion 114 and the third connecting portion 124; the second branch 144 is overlapped with the second connecting portion 118 and the fourth connecting portion 128 so as to constitute a required storage capacitance.

In the embodiment, a tip of a portion of the second V-shaped electrode patterns V2 is configured with the first protrusion electrode pattern P1 pointing at the adjacent first V-shaped electrode pattern V2. Meanwhile, the first protrusion electrode pattern P1 has a second potential of the second pixel electrode 120, which helps to reinforce an electric field strength from the tip of the second V-shaped electrode pattern V2 to the tip of the first protrusion electrode pattern P1. Accordingly, the pixel structure 100 may provide a desired distribution of a driving electric field so as to improve the display quality.

Figure 2:
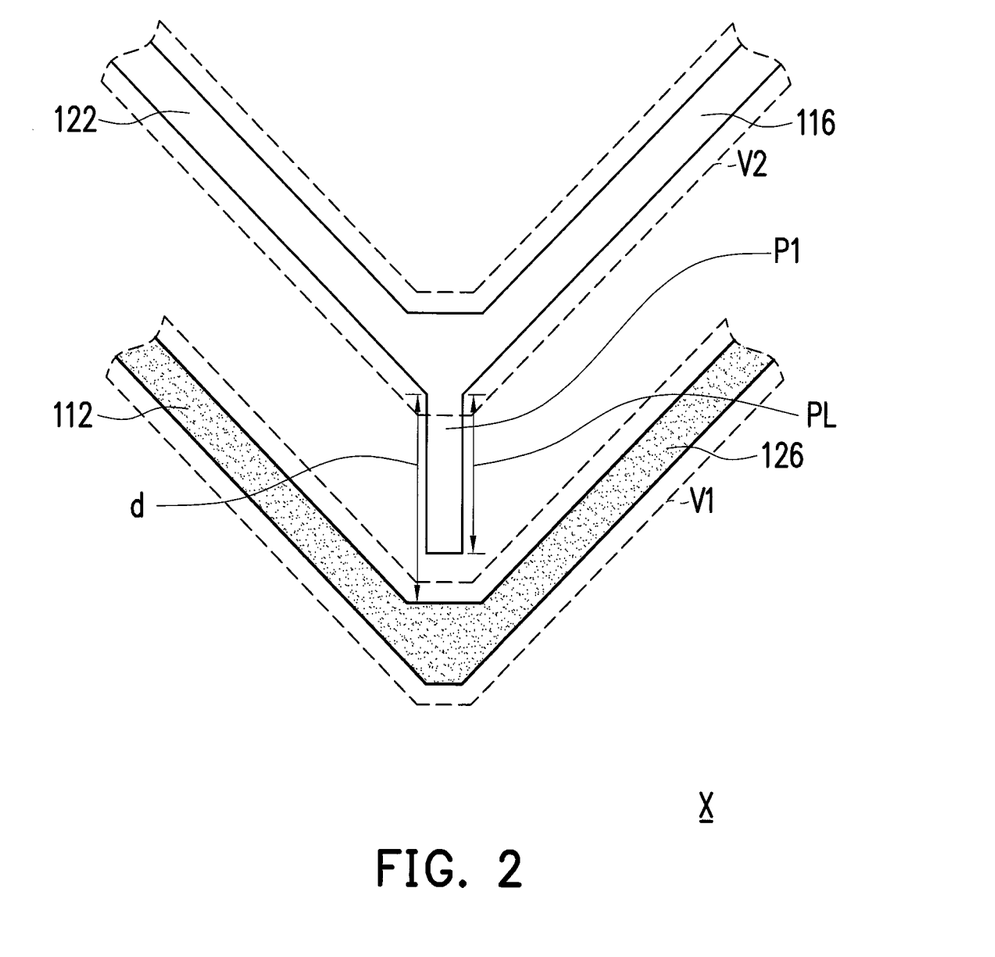
FIG. 2 is a schematic view illustrating local enlargement of a region X in FIG. 1.

Specifically, FIG. 2 is a schematic view illustrating local enlargement of a region X in FIG. 1. Please refer to FIG. 2. In the embodiment, the longer the protruding length PL of each of the first protrusion electrode patterns P1 towards the adjacent first V-shaped electrode pattern V1 from the tip of each of the second V-shaped electrode patterns V2 is, the more the electric field strength from the tip of the second V-shaped electrode pattern V2 to the tip of the first protrusion electrode pattern P1 is reinforced. Therefore, when a distance d is kept between each of the second V-shaped electrode patterns V2 and the adjacent first V-shaped electrode pattern V1, the length PL may be substantially no less than 2.5% of the distance d. In the meantime, the distance d is, for example, measured along the boundary of the first region I and the second region II.

Additionally, the first V-shaped electrode patterns V1 and the second V-shaped electrode patterns V2 have to be electrically independent. Therefore, the length PL is substantially less than the distance d. That is to say, each of the first protrusion electrode patterns P1 is separated from the adjacent first V-shaped electrode pattern V1.

Certainly, the length PL may vary according the distance d between the tip of the second V-shaped electrode patterns V2 and the tip of the first protrusion electrode patterns P1. For example, when the distance d between the tip of the second V-shaped electrode patterns V2 and the tip of the adjacent first V-shaped electrode patterns V1 is small enough to allow the distribution of the driving electric field not to be affected by a parasite electric field, the tip of the second V-shaped electrode patterns V2 may be optionally configured without the first protrusion electrode pattern P1. As shown in FIG. 1, the tip of the portion of the second V-shaped electrode patterns V2 is configured without the first protrusion electrode patterns P1.

Figure 3:
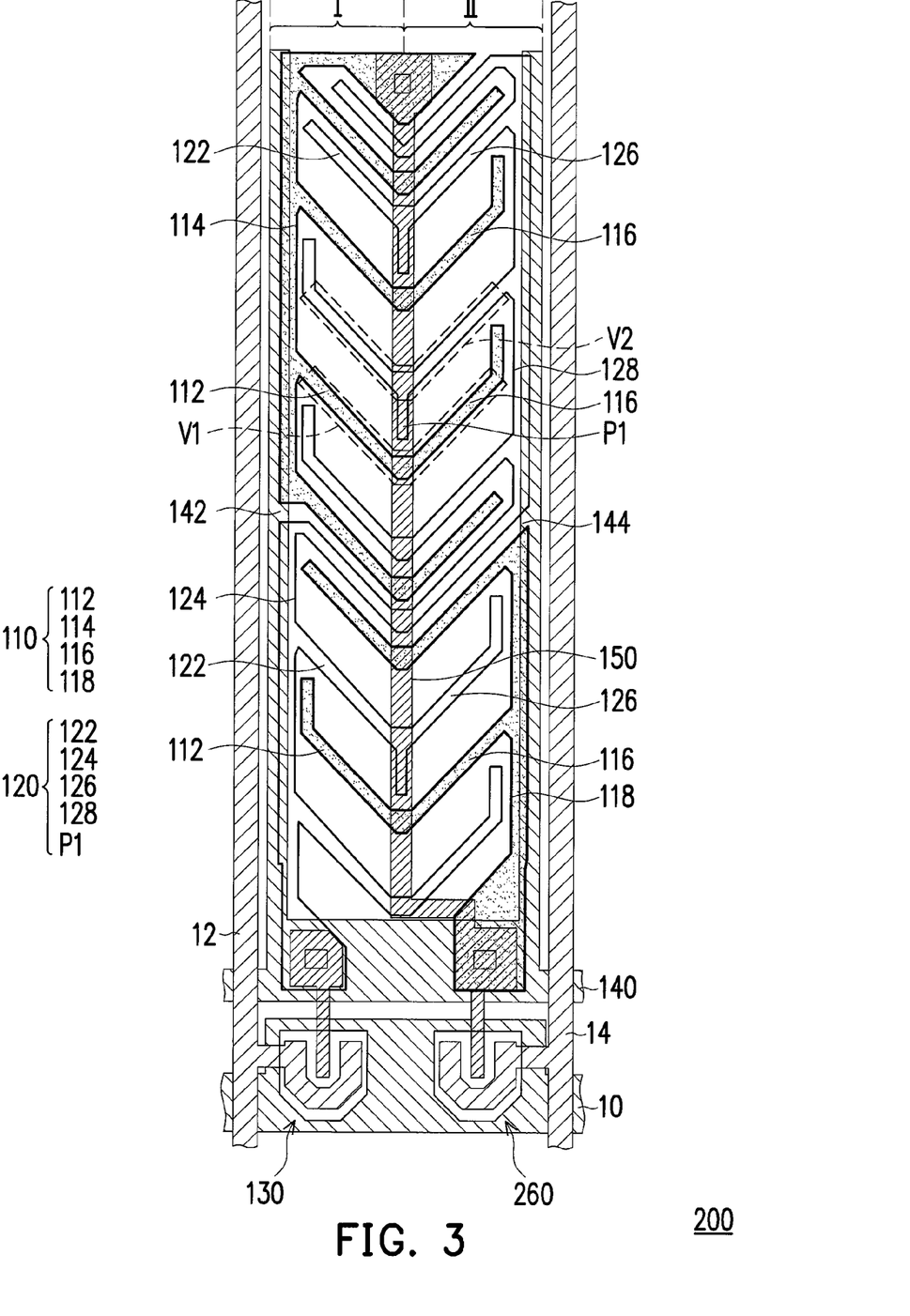
FIG. 3 is a top view illustrating a pixel structure in a second embodiment of the invention.

FIG. 3 is a top view illustrating a pixel structure in a second embodiment of the invention. Please refer to FIG. 3. A pixel structure 200 is mostly the same as the pixel structure 100. Therefore, in the two embodiments, the same components are denoted by the same reference numbers. Specifically, apart from including all the components in the pixel structure 100, the pixel structure 200 further includes a connecting electrode 150 and another active device 260, and the first pixel electrode 110 is connected to the active device 260 instead of being connected to the common electrode 140.

The connecting electrode 150 electrically connects the first pixel electrode 110 to the active device 260. Specifically, the connecting electrode 150 is, for example, located under the first pixel electrode 110 and the second pixel electrode 120. When the pixel structure 100 is fabricated on a substrate (not shown), the connecting electrode 150 is located between the substrate and the first pixel electrode 110 as well as between the substrate and the second pixel electrode 120. The connecting electrode 150 is located at the boundary of the first region I and the second region II and therefore overlapped with the first protrusion electrode pattern P1.

In the embodiment, the extending directions of the first connecting portion 114, the second connecting portion 118, the third connecting portion 124, and the fourth connecting portion 128 are parallel with the extending direction of the connecting electrode 150. Furthermore, the first connecting portion 114 and the third connecting portion 124 are located at a first side of the connecting electrode 150; the second connecting portion 118 and the fourth connecting portion 128 are located at a second side of the connecting electrode 150, wherein the first side and the second side are opposite to each other. In addition, the portion of the first oblique electrode patterns 112 connected to the first connecting portion 114 are configured between the first connecting portion 114 and the connecting electrode 150 and the rest of the first oblique electrode patterns 112 not connected to the first connecting portion 114 are configured between the third connecting portion 124 and the connecting electrode 150. The portion of the third oblique electrode patterns 112 connected to the third connecting portion 124 are configured between the third connecting portion 124 and the connecting electrode 150 and the rest of the third oblique electrode patterns 122 not connected to the third connecting portion 124 are configured between the first connecting portion 114 and the connecting electrode 150. Also, the portion of the second oblique electrode patterns 116 connected to the second connecting portion 118 are configured between the second connecting portion 118 and the connecting portion 150 and the rest of the second oblique electrode patterns 116 not connected to the second connecting portion 118 are configured between the fourth connecting portion 128 and the connecting electrode 150. The portion of the fourth oblique electrode patterns 126 connected to the fourth connecting portion 128 are configured between the fourth connecting portion 128 and the connecting electrode 150 and the rest of the fourth oblique electrode patterns 126 not connected to the fourth connecting portion 128 are configured between the second connecting portion 118 and the connecting portion 150.

In the embodiment, the connecting electrode 150 crosses over the tips of first V-shaped electrode patterns V1 and the second V-shaped electrode patterns V2 and is electrically connected to the first pixel electrode 110. In the case where the connecting electrode 150 and the first pixel electrode 110 belong to different film layers, an electric field between the tip of the first V-shaped electrode patterns V1 and the connecting electrode 150 will cause a driving electric field that is predeterminedly to be formed between the first V-shaped electrode patterns V1 and the second V-shaped electrode patterns V2 to be disturbed. Specifically, when an included angle between the first V-shaped electrode patterns V1 and the connecting electrode 150 is an acute angle, the disturbance to the electric field will be more severe. Therefore, the electric field between the tip of the first V-shaped electrode patterns V1 and the connecting electrode 150 may be called a parasite electric field. When the pixel structure 100 drives a display medium to perform display, it is likely that the desired image cannot be displayed due to the presence of the parasite electric field.

In the embodiment, the tip of the second V-shaped electrode patterns V2 is configured with the first protrusion electrode pattern P1 pointing at the adjacent first V-shaped electrode pattern V1. Meanwhile, the first protrusion electrode pattern P1 has the second potential of the second pixel electrode 120, which helps to reinforce the electric field strength from the tip of the second V-shaped electrode patterns V2 to the tip of the first protrusion electrode pattern P1. Therefore, the pixel structure 100 may provide the desired distribution of the driving electric field so as to improve the display quality.

In addition, the active device 130 and the active device 260 may be driven by the same scan line 10 and respectively connected to the data line 12 and another data line 14, which should not be construed as a limitation to the invention. In other embodiments, the active device 130 and the active device 260 may be driven by different scan lines. Alternatively, in other embodiments, the active device 130 and the active device 260 are connected to the same data line. In that case, the first pixel electrode 110 and the second pixel electrode 120 may respectively receive different first potential and second potential through the active device 260 and the active device 130. Certainly, one of the first potential and the second potential may be a common potential. In the embodiment, there is not need to set limitation to the value of the first potential and the second potential.

The first embodiment is described with the illustration in which the second pixel electrode 120 is connected to the active device and the first pixel electrode 110 is connected to the electrode of the common potential, which should not be construed as a limitation to the invention. In other embodiments, the second pixel electrode 120 may be connected to the electrode of the common potential and the first pixel electrode 110 may be connected to the active device, wherein FIG. 3 shows an example that the first pixel structure 110 is connected to the structure of the active device 260. In addition, the aforementioned embodiments adopt the first protrusion electrode patterns P1 to be configured at the tip of the second V-shaped electrode patterns V2, which should not be construed as a limitation to the invention.

Additionally, in the embodiment, with the design of patterns such as the length of the connecting portions 114, 118, 124, and 128 or the distance between the connecting portions 114, 118, 124, 128 and the data lines 12 and 14, a coupling capacitance between the first pixel electrode 110 and the data line 14 is enabled to be substantially equal to a coupling capacitance between the first pixel electrode 110 and the data line 12, and a coupling capacitance between the second pixel electrode 120 and the data line 14 is also enabled to be substantially equal to a coupling capacitance between the second pixel electrode 120 and the data line 12.

Figure 4:
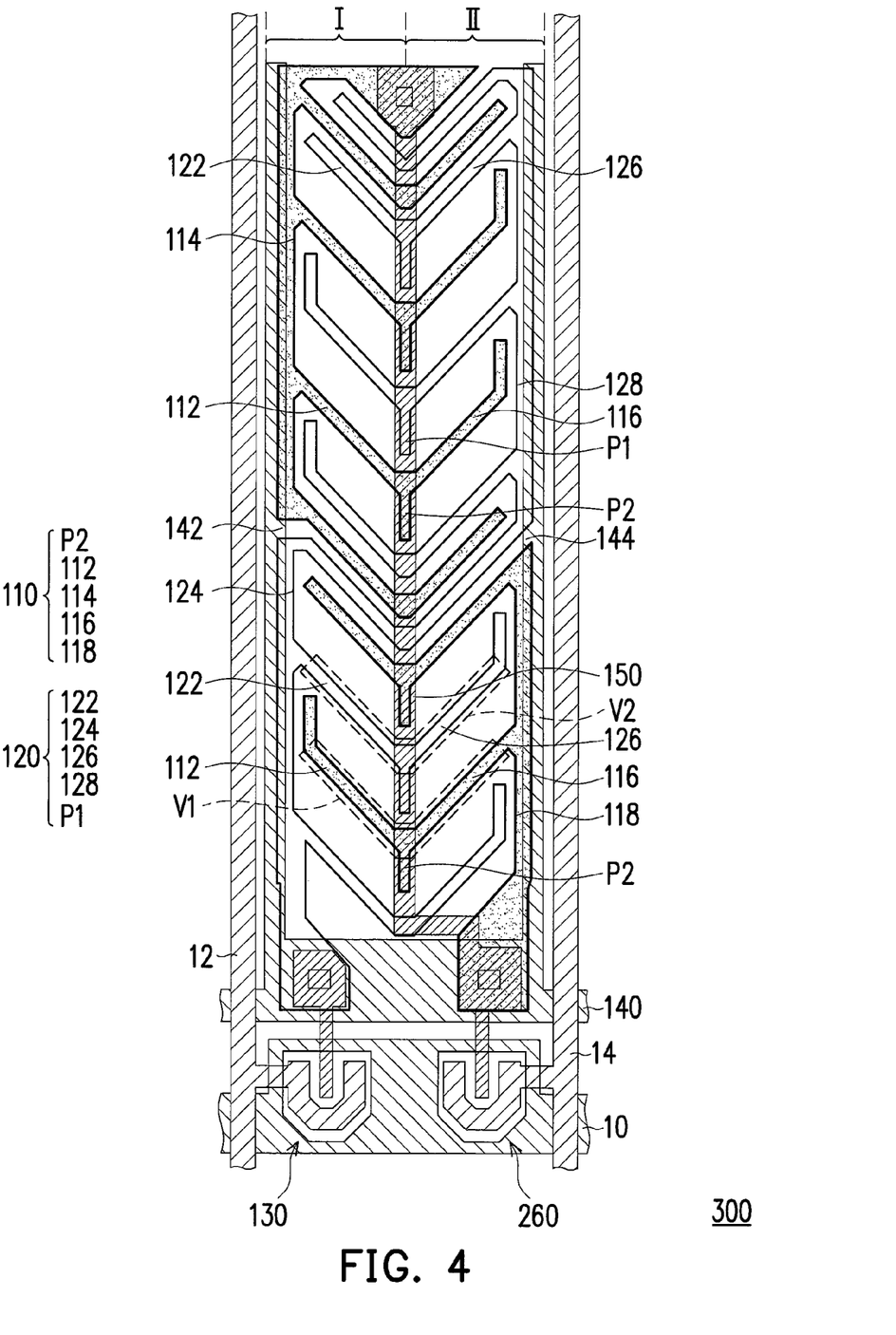
FIG. 4 is a top view illustrating a pixel structure in a third embodiment of the invention.

FIG. 4 is a top view illustrating a pixel structure in a third embodiment of the invention. Please refer to FIG. 4. A pixel structure 300 is mostly the same as the pixel structure 100. Therefore, the same components in the two embodiments are denoted by the same reference numbers. Specifically, the first pixel electrode 110 of the pixel structure 300 further includes second protrusion electrode patterns P2. Each of the second protrusion electrode patterns P2 is connected to one of the first V-shaped electrode patterns V1 so as to protrude towards the adjacent second V-shaped electrode pattern V2 from the tip of corresponding first V-shaped electrode pattern V1. Here, in order to keep the first pixel electrode 110 and the second pixel electrode 120 to be electrically independent, the second protrusion electrode pattern P2 is separated from the adjacent second V-shaped electrode pattern V2.

Figure 5:
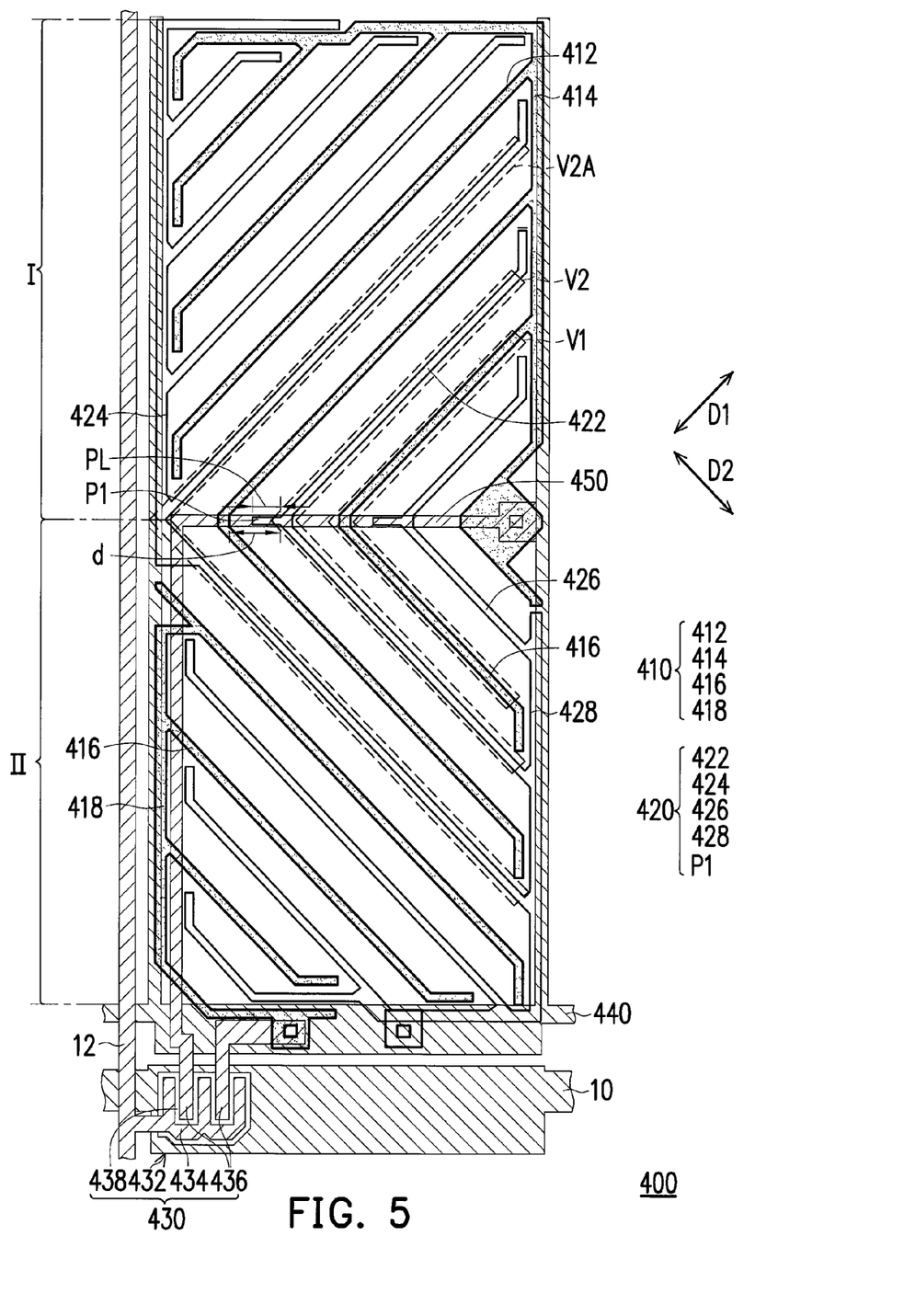
FIG. 5 is a top view illustrating a pixel structure in a fourth embodiment of the invention.

FIG. 5 is a top view illustrating a pixel structure in a fourth embodiment of the invention. Please refer to FIG. 5. A pixel structure 400 includes a first pixel electrode 410, a second pixel electrode 420, an active device 430, a common electrode 440, and a connecting electrode 450. Similar to the first embodiment, the active device 430 includes, for example, a gate 432 connected to a scan line 10, a source 434 connected to a data line 12, a drain 436, and a channel 438 at least located between the source 434 and the drain 436. In the embodiment, the first pixel electrode 410 is, for example, connected to the drain 436, and the second pixel electrode 420 is electrically connected to the common electrode 440, which should not be construed as a limitation to the invention. The first pixel electrode 410 and the second pixel electrode 420 may be respectively connected to the active device 430 and the common electrode 440. Alternatively, the pixel structure 400 may have two active devices so as to allow the first pixel electrode 410 and the second pixel electrode 420 to be connected to different active devices, respectively. In that case, the first pixel electrode 410 and the second pixel electrode 420 may have different first potential and second potential, respectively.

Specifically, the pixel structure 100 has the first region I and the adjacent second region II. The first pixel electrode 410 includes a plurality of first oblique electrode patterns 412 located in the first region I, a first connecting portion 414 located in the first region I, a plurality of second oblique electrode patterns 416 located in the second region II, and the second connecting portion 418 located in the second region II. The first oblique electrode patterns 412 are respectively parallel with a first direction D1; the second oblique electrode patterns 416 are respectively parallel with a second direction D2, and the first direction D1 and the second direction D2 intersect with each other. Also, at least a portion of the first oblique electrode patterns 412 is connected to at least a portion of the second oblique electrode patterns 416 so as to form a plurality of first V-shaped electrode patterns V1. The tip of the first V-shaped electrode patterns V1 is located at the boundary of the first region I and the second region II. As for the first pixel electrode 110, all the first oblique electrode patterns 412 are located between the first connecting portion 414 and the data line 12; the second connecting portion 418 is located between the second oblique electrode patterns 416 and the data line 12.

The second pixel electrode 420 includes a plurality of third oblique electrode patterns 422 located in the first region I, a third connecting portion 424 located in the first region I, a plurality of fourth oblique electrode patterns 426 located in the second region II, a fourth connecting portion 428 located in the second region II, and a plurality of first protrusion electrode patterns P1. The third oblique electrode patterns 422 are respectively parallel with the first direction D1, and the fourth oblique electrode patterns 426 are respectively parallel with the second direction D2. Meanwhile, all the first oblique electrode patterns 412 and all the third oblique electrode patterns 422 are configured between the first connecting portion 414 and the third connecting portion 424. All the second oblique electrode patterns 416 and all the fourth oblique electrode patterns 426 are configured between the second connecting portion 418 and the fourth connecting portion 428.

At least a portion of the third oblique electrode patterns 422 is connected to at least a portion of the fourth oblique electrode patterns 426 so as to form a plurality of second V-shaped electrode patterns V2. Besides, each of the first protrusion electrode patterns P1 is connected to one of the second V-shaped electrode patterns V2 and protrudes towards the adjacent first V-shaped electrode pattern V1 from the tip of second V-shaped electrode patterns V2. Specifically, the third oblique electrode patterns 422 and the first oblique electrode patterns 412 are alternately arranged in the first region I. The fourth oblique electrode patterns 426 and the second oblique electrode patterns 416 are alternately arranged in the second region II.

FIG. 5 shows that one of the second V-shaped electrode patterns V2 is connected to the third connecting portion 424 and the fourth connecting portion 428 at the same time, which is labeled as a second V-shaped electrode pattern V2A. The configuration of the second V-shaped electrode pattern V2A, the third connecting portion 424, and the fourth connecting portion 428 allows all the third oblique electrode patterns 422 and the fourth oblique electrode patterns 426 to be connected together so as to be electrically connected to the same second potential. However, in order to allow the first pixel electrode 410 and the second pixel electrode 420 to be formed with the same film, the first pixel electrode 410 cannot be connected integrally due to the configuration of the second V-shaped electrode pattern V2A.

Therefore, in the embodiment, the connecting electrode 450 is located under the first pixel electrode 410 and the second pixel electrode 420, and the connecting electrode 450 is electrically connected to the first pixel electrode 410 so as to allow the entire first pixel electrode 410 to have the first potential. In the meantime, the connecting electrode 450 is located at the boundary of the first region I and the second region II. Specifically, an extending direction of the connecting electrode 450 intersects with extending directions of the first connection portion 414, the second connecting portion 418, the third connecting portion 424, and the fourth connecting portion 428. The first connecting portion 414 and the fourth connecting portion 428 are located at a first end of the connecting electrode 450; the second connecting portion 418 and the third connecting portion 424 are located at a second end of the connecting electrode 450.

In the embodiment, the first protrusion electrode pattern P1 is overlapped with the connecting electrode 450 and protrudes towards the adjacent first V-shaped electrode pattern V1 from the corresponding second V-shaped electrode pattern V2. Therefore, the configuration of the first protrusion electrode pattern P1 helps to reinforce the electric field strength from the tip of the second V-shaped electrode pattern V2 to the tip of the first protrusion electrode pattern P1, thereby improving the display quality presented by the display medium driven by the pixel structure 400.

In the embodiment, please refer to the first embodiment for the description regarding the protruding length of the first protrusion electrode pattern P1 towards the adjacent first V-shaped electrode pattern V1 from the corresponding second V-shaped electrode pattern V2. That is to say, when a distance d is kept between each of the second V-shaped electrode patterns V2 and the adjacent first V-shaped electrode pattern V1, the length PL may be substantially no less than 2.5% of the distance d. In the meantime, the distance d is, for example, measured along the extending direction of the connecting electrode 150 or along the boundary of the first region I and the second region II.

In summary, in the embodiments of the invention, the pixel structure has two pixel electrodes that are predeterminedly to be inputted with different potentials, and both of the pixel electrodes have a strip-shaped oblique electrode pattern, respectively. The oblique electrode pattern of the two pixel electrodes constitutes a plurality of V-shaped electrode patterns. In order to realize electrical connection of each pixel electrode, the pixel structure further includes a connecting electrode crossing over the V-shaped electrode patterns. Meanwhile, the connecting electrode is electrically connected to only one of the pixel electrodes, and not electrically connected to the protrusion electrode pattern protruding from the tip of the V-shaped electrode patterns configured on the pixel electrode of the connecting electrode. Accordingly, the driving electric field formed between the two pixel electrodes has a desired distribution which helps to acquire the desired display quality when the display medium is driven.

Although the invention has been disclosed by the above embodiments, the embodiments are not intended to limit the invention. It will be apparent to those skilled in the art that various modifications and variations can be made to the structure of the invention without departing from the scope or spirit of the invention. Therefore, the protecting range of the invention falls in the appended claims.

What is claimed is:

1. A pixel structure, having a first region and a second region adjacent to each other, comprising:
   a first pixel electrode, connected to a first potential and comprising a plurality of first oblique electrode patterns located in the first region and a plurality of second oblique electrode patterns located in the second region, at least a portion of the first oblique electrode patterns being connected to at least a portion of the second oblique electrode patterns so as to form a plurality of first V-shaped electrode patterns, wherein a tip of the first V-shaped electrode patterns is located at a boundary of the first region and the second region, wherein the first pixel electrode further comprises a first connecting portion located in the first region and a second connecting portion located in the second region, the first connecting portion is connected to a portion of the first oblique electrode patterns, and the second connecting portion is connected to a portion of the second oblique electrode patterns; and
   a second pixel electrode, connected to a second potential and comprising a plurality of third oblique electrode patterns, a plurality of fourth oblique electrode patterns and a plurality of first protrusion electrode patterns, the third oblique electrode patterns and the first oblique electrode patterns being alternately arranged in the first region, the fourth oblique electrode patterns and the second oblique electrode patterns being alternately arranged in the second region, wherein at least a portion of the third oblique electrode patterns is connected to at least a portion of the fourth oblique electrode patterns so as to form a plurality of second V-shaped electrode patterns, and each of the first protrusion electrode patterns is connected to one of the second V-shaped electrode patterns and protrudes towards an adjacent first V-shaped electrode pattern from a tip of the corresponding second V-shaped electrode pattern, wherein the second pixel electrode further comprises a third connecting portion located in the first region and a fourth connecting portion located in the second region, the third connecting portion is connected to a portion of the third oblique electrode patterns, and the fourth connecting portion is connected to a portion of the fourth oblique electrode patterns.

2. The pixel structure according to claim 1, wherein the first oblique electrode patterns and the third oblique electrode patterns are respectively parallel with a first direction, and the second oblique electrode patterns and the fourth oblique electrode patterns are respectively parallel with a second direction.

3. The pixel structure according to claim 1, wherein a distance d is kept between each of the second V-shaped electrode patterns and the adjacent first V-shaped electrode pattern, and a protruding length of each of the first protrusion electrode patterns towards the adjacent first V-shaped electrode pattern is substantially no less than 2.5% of the distance d.

4. The pixel structure according to claim 1, wherein each of the first protrusion electrode patterns is separated from the adjacent first V-shaped electrode pattern.

5. The pixel structure according to claim 1, further comprising a connecting electrode, wherein the connecting electrode is electrically connected to the first pixel electrode and has the first potential, the connecting electrode is located at the boundary of the first region and the second region, and the first protrusion electrode patterns are overlapped with the connecting electrode.

6. The pixel structure according to claim 5, wherein the first connecting portion, the second connecting portion, the third connecting portion, the fourth connecting portion, and the connecting electrode extend in a same extending direction, the first connecting portion and the third connecting portion are located at a first side of the connecting electrode, and the second connecting portion and the fourth connecting portion are located at a second side of the connecting electrode.

7. The pixel structure according to claim 5, wherein the portion of the first oblique electrode patterns connected to the first connecting portion are configured between the first connecting portion and the connecting electrode, the rest of the first oblique electrode patterns not connected to the first connecting portion are configured between the third connecting portion and the connecting electrode, the portion of the third oblique electrode patterns connected to the third connecting portion are configured between the third connecting portion and the connecting electrode, and the rest of the third oblique electrode patterns not connected to the third connecting portion are configured between the first connecting portion and the connecting electrode.

8. The pixel structure according to claim 7, wherein the portion of the second oblique electrode patterns connected to the second connecting portion are configured between the second connecting portion and the connecting electrode, the rest of the second oblique electrode patterns not connected to the second connecting portion are configured between the fourth connecting portion and the connecting electrode, the portion of the fourth oblique electrode patterns connected to the fourth connecting portion are configured between the fourth connecting portion and the connecting electrode, and the rest of the fourth oblique electrode patterns not connected to the fourth connecting portion are configured between the second connecting portion and the connecting electrode.

9. The pixel structure according to claim 1, further comprising a first active device and a second active device, respectively connected to the first pixel electrode and the second pixel electrode.

10. The pixel structure according to claim 9, wherein the first active device and the second active device are driven by a same scan line.

11. The pixel structure according to claim 10, wherein the first active device and the second active device are connected to different data lines.

12. The pixel structure according to claim 1, wherein the first pixel electrode further comprises a plurality of second protrusion electrode patterns, and each of the second protrusion electrode patterns is connected to one of the first V-shaped electrode patterns and protrudes towards an adjacent second V-shaped electrode pattern from the first V-shaped electrode pattern.

13. The pixel structure according to claim 1, further comprising a first active device, wherein one of the first pixel electrode and the second pixel electrode is connected to the first active device, and the other one of the first pixel electrode and the second pixel electrode is connected to a common electrode.

* * * * *